July 29, 1958 E. G. TIEGEL 2,845,469
STORAGE BATTERY PLATES AND A METHOD OF MAKING THE SAME
Filed Aug. 25, 1953
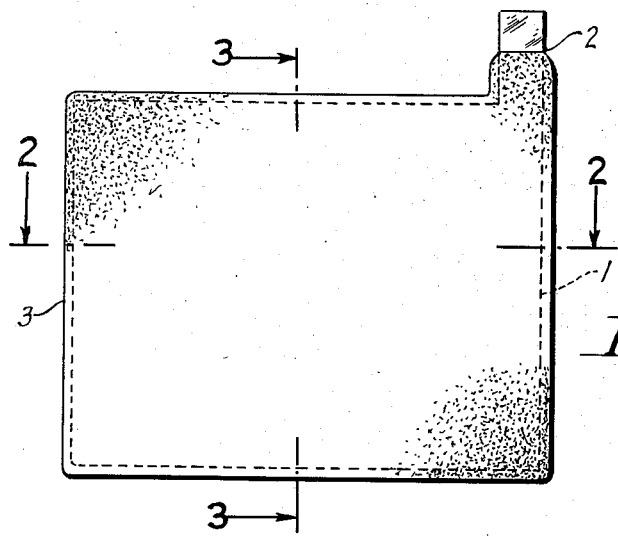
Fig.1.
Fig.2.
Fig.3.
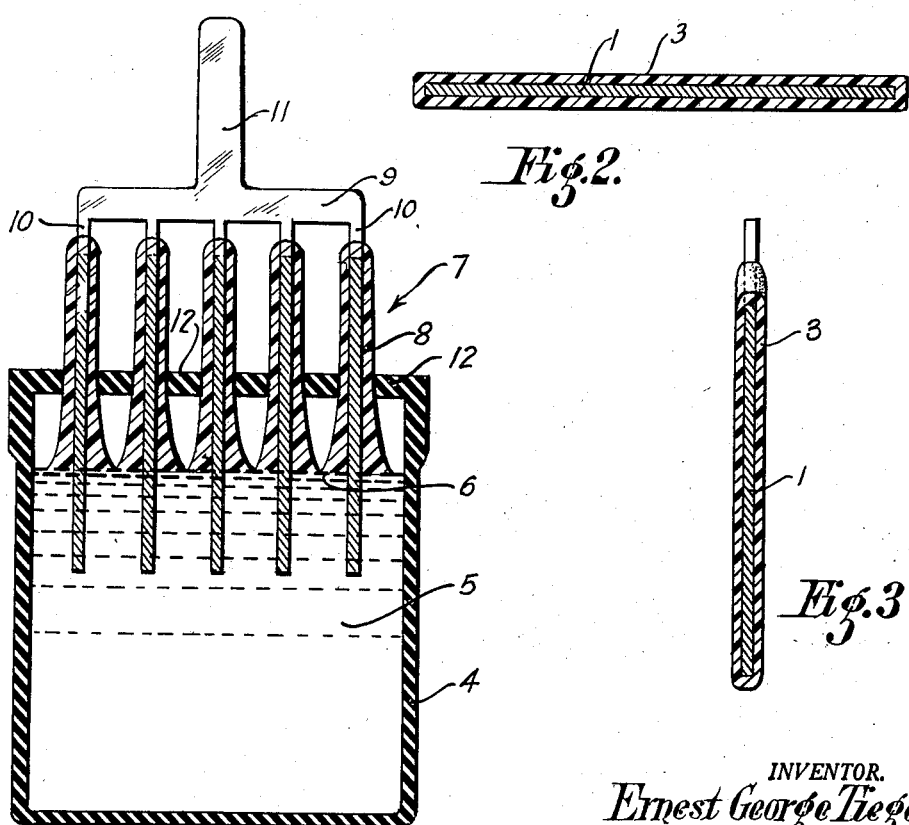
Fig.4.
INVENTOR.
Ernest George Tiegel
BY
A. Schapp
ATTORNEY

2,845,469

STORAGE BATTERY PLATES AND A METHOD OF MAKING THE SAME

Ernest George Tiegel, Belmont, Calif.

Application August 25, 1953, Serial No. 376,317

4 Claims. (Cl. 136—19)

The present invention relates to improvements in storage battery plates and a method of making the same, and its principal object is to provide a battery plate which had a separator adhesively secured thereto.

A further object of my invention is to provide a battery plate that has a separator adhesively applied to both faces and to the edges thereof, with the separator material extending upward to cover a portion of the lug projecting from the upper edge of the plate.

A still further object of the invention is to provide a method of applying the coating or separator material by a mere dipping operation.

It is further proposed to provide a simple process whereby the separator material may be applied to a connected group of battery plates, either positive or negative.

It is additionally proposed to provide a suitable compound which when applied to the battery plate in the form of a coating will provide the necessary characteristics of a battery separator, as to insulation and porosity.

Further objects and advantages of my invention will appear as the specification proceeds, and the new and novel features of the invention will be fully defined in the claims attached hereto.

The preferred form of my invention is illustrated in the accompanying drawing, forming part of this application, in which:

Figure 1 shows a face view of a battery plate having my separator coating applied thereto;

Figure 2, a horizontal section through the same, taken along line 2—2 of Figure 1;

Figure 3, a vertical section through the same, taken along line 3—3 of Figure 1; and Figure 4, a vertical section through a container used for dipping a battery plate group, with the latter shown in position.

While I have shown only the preferred form of my invention, it should be understood that various changes or modifications may be made within the scope of the claims attached hereto, without departing from the spirit of the invention.

Referring to the drawing in detail, Figures 1, 2 and 3 show an individual battery plate 1 of conventional form and having the conventional lug 2 projecting from the upper edge thereof. The plate has a separator compound 3 adhesively applied thereto, in the form of a coating, which covers not only the faces of the plate, but also all the edges thereof and a portion of the lug to a height somewhat below the burning height.

The coating is preferably applied by merely dipping the plate into a suitable liquid compound having the desired characteristics of a battery separator, up to the desired height, and by drying the coating upon withdrawal.

While numerous compounds may be developed for the purposes indicated, depending upon results desired, I have developed the following formula, which is given herewith by way of example only and which may be readily modified by experts in the art to suit different conditions:

200 grams of dry wheat paste
4000 grams of water
200 grams of kieselguhr
200 grams of lignin
100 grams of shredded spun glass
40 grams of Lauxite U. F. 108 resin The wheat paste serves principally to keep the other ingredients in suspension and to control the thickness of the application, which might be ultimately (after drying) approximately one-sixteenth of an inch. This paste merely serves as a temporary binder and may be washed out later or naturally disappears in use, providing the necessary porosity.

The kieselguhr builds up mechanical strength, and also provides for a certain degree of porosity.

The lignin (saw dust cooked in lye to wash out natural rosins, sap etc.) builds up volume of the separator, gives it thickness and desired porosity and has a generally beneficial effect.

The spun glass builds up the volume, and adds mechanical strength and particularly tensional strength. The fibers may be shredded to approximately one-quarter of an inch.

The Lauxite U. F. 108 resin serves as a binder to hold all the ingredients together when the starch or wheat paste washes out. Other binders like urea resins or phenolic resins or latex may be substituted.

The first five ingredients may be mixed in any suitable manner, but the resin should be added last to prevent clogging up of the other ingredients.

The plate, if coated individually, is merely dipped into this compound, withdrawn and then dried. After drying, the wheat paste may be washed out. The plates may then be assembled into suitable groups, with straps connecting the lugs and binding posts mounted on the straps. It stands to reason that only one of the two groups assembled into the battery need be insulated in the manner set forth, either the positive one or the negative one.

Where it is desired to apply the coating of compound to a group as a whole, the arrangement shown in Figure 4 may be used. This figure shows a suitable container 4 for the compound shown at 5, the level of the compound being indicated at 6. A group of battery plates is shown at 7 in the act of being withdrawn from the container.

The group of battery plates is shown as comprising a number of plates 8 arranged in parallel relation and interconnected by a strap 9 at their lugs 10, the strap having a binding post 11 rising therefrom. With the compound just right, and the spacing between the plates considerably in excess of the combined thicknesses of the two coats of compound, it is possible to perform the dipping action in the same manner as previously described in connection with a single plate.

However, with allowance made for subsequent shrinking during the drying operation, and assuming that the spacing between the plates does not greatly exceed one-quarter of an inch, while an ultimate coating of one-sixteenth of an inch is desired, which calls for a heavier layer of wet application, it is apparent that during the withdrawal action there is not much space left between two adjacent coats and that there is a possibility of the compound bridging the space and forming a compact unit with the plates.

In order to avoid this occurrence, I preferably employ a grid or comb 12 on top of the container, the comb merely comprising, in its simplest form, a series of spaced slats extending across the top in spaced relation. The spacing is such that the plates may pass through the slots centrally, with enough space left on opposite sides of the plates, to correspond to the desired thickness of coating on each side.

The drawing shows the group of battery plates in the position of being withdrawn. The level of the compound at the time indicated, is shown at 6, but during the act of inserting should rise approximately to the height of the comb. Thus, during insertion, the plates are coated completely, including their upper edges and portions of the straps, while during the withdrawal the slats serve to strip the layers or coatings to a desired uniform thickness and to prevent any bridging of the compound across the intervening spaces.

Thus complete layers or coatings of insulating material are applied to all the plates of one group in a simple dipping operation. Since these coatings cover the plates completely, the plates of the second group, whether positive or negative, need not any application of separator material, and may be interlaced with the plates of the first group in the conventional manner, without any further treatment.

This method does away with the use of individual separators as employed at the present time, and all danger of shorting across the edges is completely eliminated, since the plate of the treated group is completely insulated along all the edges thereof.

In case where double or triple insulation is desirable or required, it is proposed that besides the coating of the plates, a standard separator, either rubber, glass, plastic or wood, be used. In this case, the suggested coating may be applied to the positive plates or to the negative plates, or both.

I claim:

1. The method of applying separator means to a group of connected and spaced battery plates which comprises the steps of dipping the group through a comb structure into a liquid separator compound for coating the plates with said compound, and then drying the latter.

2. The method of applying separator means to a group of battery plates having registering lugs and a strap connecting the lugs, which comprises the steps of dipping the group through a comb structure into a liquid separator compound to a depth intermediate the height of the lugs for coating the plates and portions of the lugs, and then drying the adhering compound.

3. A portable battery plate group comprising a series of substantially uniformly-spaced plates having registering lugs projecting from the upper edges thereof, with a strap connecting the upper ends of the lugs and maintaining said plates in said spaced relation, the plates having layers of inherently porous, insulating separator compounds of uniform thickness adhesively applied to both faces and the edges thereof, the thickness of the compound being in the order of one-sixteenth of an inch and the spacing between adjacent plates being considerably in excess of the combined thicknesses of the two layers of separator compound on such adjacent plates so that the spacing between adjacent layers of compound will admit the entry of a plate of a second group therebetween, and the compound being non-soluble in electrolyte.

4. A battery plate assembly comprising two groups of battery plates separably interlaced to form a battery plate assembly, the plate of at least one of the groups having layers of an inherently porous separator compound adhesively applied to the faces and the edges thereof, the compound being non-soluble in electrolyte and of a thickness in the order of one-sixteenth of an inch, the separator compound on the plates of said one group being disposed closely adjacent to corresponding faces of the plates of the second group so as to constitute separators between the first and second groups of plates.

References Cited in the file of this patent

UNITED STATES PATENTS

| | | |
|---|---|---|
| 364,344 | Hard | June 7, 1887 |
| 756,176 | Meygret | Mar. 29, 1904 |
| 760,897 | Meygret | May 24, 1904 |
| 994,451 | Frederickson | June 6, 1911 |
| 1,433,017 | McKee | Oct. 24, 1922 |
| 1,725,734 | Heap | Aug. 20, 1929 |
| 2,184,373 | Adams | Dec. 26, 1939 |
| 2,422,130 | Proctor | June 10, 1947 |

FOREIGN PATENTS

| | | |
|---|---|---|
| 1890/1901 | Great Britain | Nov. 30, 1901 |
| 274,208 | Great Britain | July 19, 1927 |